Dec. 19 1922.

R. LANDENBERGER.
CALCULATING DEVICE.
FILED JUNE 11, 1921.

1,439,246

Witness:
Geo. C. Harrison

Inventor
Ralph Landenberger
By Wilkinson Huxley Byrn & Knight
Attys.

Patented Dec. 19, 1922.

1,439,246

UNITED STATES PATENT OFFICE.

RALPH LANDENBERGER, OF CHICAGO, ILLINOIS.

CALCULATING DEVICE.

Application filed June 11, 1921. Serial No. 476,744.

*To all whom it may concern:*

Be it known that I, RALPH LANDENBERGER, a citizen of the United States, residing at Chicago, in the county of Cook and State of Illinois, have invented certain new and useful Improvements in Calculating Devices, of which the following is a specification.

This invention relates to a new and improved calculating device, and more specifically to a device not only adapted for use in finding proportional equivalents, but also in solving problems involving percentages.

I have heretofore patented a calculating device under date of July 11, 1911, Patent No. 997,680, which comprises two relatively movable logarithmic scales and an index movable relative to both scales, the index also carrying a scale adapted to coact with lines upon one of the scales for setting or reading fractional results and showing the third figure in results reading to three or more figures. This form of calculating device is very efficient for use in finding equivalents in the paper trade and in similar problems and also multiplies and divides with great facility. However, additional means are desirable in connection with this device to particularly adapt it to solving such commercial problems as involve percentages of profits, selling prices under chain discounts, and other problems of that nature.

It is an object of the present invention to provide a device of the character described adapted to readily solve problems of this type, which is simple in design and construction.

It is a further object to provide a device which is easily and readily manipulated and wherein the results may be read with accuracy.

Broadly, my invention comprises a device similar to that of my prior patent as has been described above, and there is added upon the movable scale member certain additional lines. One line placed adjacent this scale is so located as to cooperate with the scale upon the index in such manner that when the index is set by intersection of that line with a number upon the index scale, the reading edge of the index will be aligned with the arithmetical complement of that number upon the scale of the movable scale member.

As has been stated, the scale in the device of my prior patent carries inwardly extending lines adapted to coact with the index scale for reading or setting fractional amounts. These lines refer to fractions between adjacent numerals. For many purposes in handling percentage problems it is desirable to provide a line which will cooperate with the index scale for setting or reading fractions of ten units of the scale. I provide such a line extending from the initial point of the scale for ten units thereof.

I have illustrated a preferred embodiment of my invention in the accompanying drawings, in which—

Figure 1:
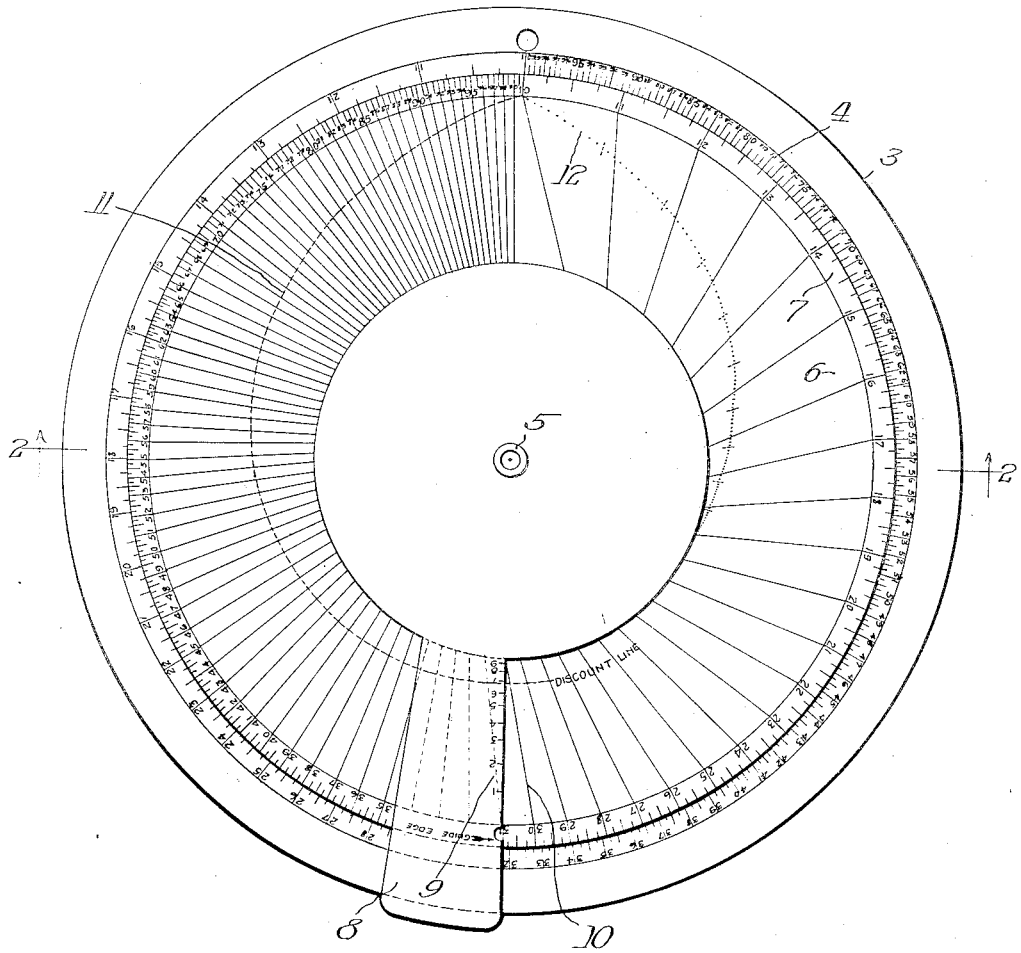
Figure 1 is a plan view of a device constructed according to my invention.
Figure 2:
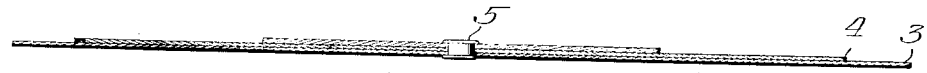
Figure 2 is a section on line 2—2 of Figure 1.

As shown in Figure 1, the fixed supporting member 3 is provided with the scale 4. The pivot 5 secures the movable scale member 6 to the member 3. The member 6 carries the scale 7 adjacent its periphery. The index 8 is also pivotedly associated with the central pivot 5. This index is provided with the scale 9 adapted to coact with lines 10 extending inwardly from the scale 7 upon the member 6. As shown, the scales 4 and 7 are reversed logarithmic scales extending from 10 to 100. The scale 9 upon the index coacts with the several lines 10 to read decimal fractions of the units of the scale 7. I provide an additional line 11 which as shown extends inwardly on a curve from the initial point of the scale upon the movable scale member. This line is so located that wherever the index is placed, the reading of the intersection of that line with the index scale is the complement of the intersection of the reading edge of the index with the scale 7. For example, as shown in the drawing, the reading upon the index is 69, and upon the scale 7, 31. The particular utility of this line will appear more fully in examples which will be given hereinafter.

I provide another additional line 12 extending to the right from the initial point of this scale 7, this line extending for a distance of ten graduations upon this scale 7. The line is so drawn that it will intersect the scale upon the index at numbers corresponding to the fractional distance relative to the ten units which the index has been moved to the right from the initial point of the scale. As shown, this line is dotted, each dot representing a distance equal to the tenth part of the adjacent unit of the scale. The unit points on the line are designated by additional dots. Obviously both the lines 11 and 12 may be made in different colors from those of the main lines of the scale, or may be formed of dotted or dash lines or in any manner desired to differentiate them from the other lines. The line 11 which is marked the discount line in the drawing has only been shown extended for a portion of the circumference. However, if desired it may be continued throughout the circumference.

The utility of my improved device is made apparent from a number of examples which follow:

*Plain discount.*

A merchant sells an article for $2.00, and in a special sale reduces the article 20 per cent. It is desired to find the new selling price after the reduction.

To derive the solution, hold the index on 20 (representing $2.00) on the large disk, turn the small disk until the discount line (line 11) intersects the index scale at 2 (representing 20 per cent). The result, $1.60 (16) appears upon the small disk opposite 10 on the large disk. It also appears upon the large disk opposite 10 on the small disk.

A more difficult example, in which the diagonal lines on the small disk are used, follows:

A merchant sells an article for $2.05, and reduces the price 20 per cent. The new selling price is desired.

In solving this problem, hold the index at 10 on the large disk and turn the small disk to register 205; that is, with the number 20 nearest the index and the diagonal line extending from 20 intersecting the index scale at 5. The index is now moved to align with 10 upon the small disk (which is 205 on the large disk). Now turn the small disk until the discount line is exactly at 2 (20 per cent) on the index. Turning the index to 10 on the large disk, the answer, $1.64, is read off the small disk.

In determining the reverse of this type of problem, if a selling price of $2.00 is reduced to $1.60, it is desired to find the amount of the discount. In solving the problem, line up 10 on the small disk with 10 on the large disk. Move the index to 20 ($2.00) on the small disk, then turn the small disk until 16 ($1.60) lines up with the index edge, turn the index to 10 on the large disk and the result, 20 per cent, appears where the discount line meets the index.

*Chain discount.*

In determining chain discount, as for example, where $21.00 is discounted successively 30 per cent, 10 per cent, and five per cent, the index is held on 21 ($21.00) on the large disk, the small disk is then turned until the discount line intersects exactly at 3 (30 per cent) on the index scale. The index is then turned to 10 on the small disk. Next the small disk is turned until the discount line intersects exactly at 1 (10 per cent) on the index. The index is then turned again to 10 on the small disk. Next the small disk is turned until the discount line intersects the index scale half-way to 1, which would be 5 per cent. The index is then turned to 10 on the large disk, and the answer, $12.57, is read upon the small disk. The 12 appears before the index and the diagonal line leading therefrom intersects the index scale at 57.

*Percentage on selling basis.*

The cost of an article being $15.00, and the desired profit is 40 per cent on a selling basis, it is desired to determine the selling price. To solve the problem, hold the index at 10 on the large disk, move the small disk until the discount line intersects the index scale at 4 (40 per cent), turn the index to 15 ($15.00) on the small disk, then turn the small disk until the 10 is opposite 10 on the large disk. The answer, $25.00, is read on the small disk at the edge of the index.

The reverse of the problem just given: Given the cost and selling price, it is desired to find the percentage of profit on a selling basis. To find the solution, line up the 10's upon each disk opposite each other, turn the index to 25 ($25.00) on the small disk, then turn the small disk until 15 ($15.00) lines up with the index. Now turn the index to 10 on the large disk, and the answer, 40 per cent, appears where the discount line intersects the index scale.

*Compound interest.*

To figure compound interest, it is not necessary to use the percentage line, or line 12, since in compound interest as practiced it is ordinarily below 10 per cent. Therefore the figures on the index scale may be considered as units, that is, 1, 2, etc., instead of 10 or 20, etc. This method of solution does not involve the additional lines of the present invention. However, these problems may be solved by using the percentage line. To do so, hold the index at 20 ($200.00) upon the large disk and turn the small disk until the sixth dot from 10 is exactly on the edge of the index. Next move the index to 10 on the small disk, which adds one year's interest. Again move the small disk until the same sixth dot is on the index and then again move the index to 10 on the small disk. These steps are repeated for the third time, which adds the third year's interest. In order to read the result accurately turn the index to 10 on the large disk and the answer, $238.20, is read from the small disk in combination with the index scale.

The method of figuring simple interest does not involve either of the additional lines. To find the interest on $200.00 at 6 per cent for 60 days, line up 20 ($200.00) on the large disk with 60 (6%) on the small disk (or 20 on small with 60 on large disk). Turn index to 36 (representing 360 days in fiscal year) on the small disk. Then turn the small disk until 60 (60 days) is even with the index. The answer, $2.00 (20) appears opposite 10 on the large disk.

Should there be difficulty in finding the capital amount on the large disk, as for instance, if it be an odd amount, find it first on the small disk by reading off the edge of the index when placed at 10 on the large disk, and then turn the index to 10 on the small disk, which is the same amount on the large disk.

*Percentage on cost basis.*

An article costs $1.50, and a profit of 40 per cent is desired. It is desired to find the selling price.

Hold the index at 15 ($1.50) on the large disk. Turn the small disk until the percentage line meets the index at 4 (40%). The result, $2.10, (21) is found opposite 10.

In any problem, if the starting point (10) does not register exactly with a number, turn the index to this point and read the answer off the index edge, where the diagonal lines intersect the index scale.

If the amount of the cost is an odd number, line up the index first with the starting point and register the cost amount with the index with the aid of the diagonal lines. Then turn the index to 10 on the small disk, which gives the corresponding amount, or position, on the large disk.

I claim:

1. In a calculating device, a supporting member, and a scale member carried thereby and movable relative thereto, an index movable relative to both said members, a scale upon the scale member, a line extending adjacent the scale, and a scale upon the index adapted to coact with the line in such manner that when set by the intersection of the line with a given number upon the index scale, the reading edge of the index designates the complement of that number upon the scale of the scale member.

2. In a calculating device, a supporting member, and a scale member carried thereby and movable relative thereto, an index movable relative to both said members, a scale upon the scale member, a scale upon the index, lines leading from the unit graduations and adapted to coact with the index scale for reading or setting fractions of said units, and a line superposed upon said first-named lines and adapted to coact with the index scale for reading or setting fractions of a plurality of said graduations.

3. In a calculating device, a supporting member, and a scale member carried thereby and movable relative thereto, an index movable relative to both said members, a scale upon the scale member, a scale upon the index, and a line leading from the initial point of the scale upon the scale member and extending over a plurality of units of said scale, the line being adapted to coact with the scale upon the index for setting or reading fractions of that portion of the scale covered by the extent of the line.

4. In a calculating device, a supporting member, and a scale member carried thereby and movable relative thereto, an index movable relative to both said members, a scale upon the scale member, a scale upon the index, and a line leading from the initial point of the scale upon the scale member and extending over a plurality of units of said scale, the line being adapted to coact with the scale upon the index for setting or reading fractions of that portion of the scale covered by the extent of the line, said line being provided with graduations to facilitate cooperation with the index.

5. In a calculating device, a supporting member, a circular scale member pivoted thereto, an index member rotatably secured to the pivot, cooperating scales carried by the supporting member and the periphery of the scale member, a line leading from the scale upon the scale member, and a scale upon the index adapted to coact with the line in such manner that when set by the intersection of the line with a given number upon the index scale, the reading edge of the index designates the complement of that number upon the scale of the scale member.

6. In a calculating device, a supporting member, a circular scale member pivoted thereto, an index member rotatably secured to the pivot, cooperating scales carried by the supporting member and the periphery of the scale member, a scale carried by the index, lines leading from the graduations of the scale of the scale member and adapted to cooperate with the scale for reading or setting fractions of the graduations, and a line extending adjacent the scale, the index scale being further adapted to coact with the line in such manner that when set by the intersection of the line with a given number upon the index scale, the reading edge of the index designates the complement of that number upon the scale of the scale member.

7. In a calculating device, a supporting member, a circular scale member pivoted thereto, an index member rotatably secured to the pivot, cooperating scales carried by the supporting member and the periphery of the scale member, a scale carried by the index, lines leading from the graduations of the scale of the member and adapted to cooperate with the scale index for reading or setting fractions of the graduations, a line superposed upon said first-named lines and adapted to coact with the index scale for reading or setting fractions of a plurality of said graduations, and an additional line extending adjacent the scale, the index scale being further adapted to coact with said additional line in such manner that when set by the intersection of the line with a given number upon the index scale, the reading edge of the index designates the complement of that number upon the scale of the scale member.

Signed at Chicago, Illinois, this 9th day of June, 1921.

RALPH LANDENBERGER.